(12) United States Patent
Ishihara et al.

(10) Patent No.: US 10,732,410 B2
(45) Date of Patent: Aug. 4, 2020

(54) IMAGE PROJECTION DEVICE AND HEAD-UP DISPLAY DEVICE PROVIDED WITH IMAGE PROJECTION DEVICE

(71) Applicant: DENSO CORPORATION, Kariya, Aichi-pref. (JP)

(72) Inventors: Kazuyuki Ishihara, Kariya (JP); Hiroshi Ando, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/216,145

(22) Filed: Dec. 11, 2018

(65) Prior Publication Data

US 2019/0107714 A1    Apr. 11, 2019

Related U.S. Application Data

(63) Continuation of application No. PCT/JP2017/023775, filed on Jun. 28, 2017.

(30) Foreign Application Priority Data

Jun. 28, 2016   (JP) ................. 2016-127756

(51) Int. Cl.

| G02B 27/01 | (2006.01) |
|---|---|
| G02B 26/10 | (2006.01) |
| G02B 26/08 | (2006.01) |
| G02B 27/00 | (2006.01) |
| H04N 9/31 | (2006.01) |

(52) U.S. Cl.
CPC ..... *G02B 27/0101* (2013.01); *G02B 26/0858* (2013.01); *G02B 26/10* (2013.01); *G02B 27/0031* (2013.01); *G02B 27/01* (2013.01); *H04N 9/3129* (2013.01); *H04N 9/3161* (2013.01); *G02B 2027/0141* (2013.01)

(58) Field of Classification Search
CPC ........... G02B 27/0101; G02B 26/0858; G02B 26/10; G02B 27/0031; G02B 27/01; G02B 2027/0141; H04N 9/3129; H04N 9/3161
See application file for complete search history.

(56) References Cited

U.S. PATENT DOCUMENTS

| 2001/0055139 A1 | 12/2001 | Hayashi |
|---|---|---|
| 2010/0014058 A1 | 1/2010 | Imai |
| 2010/0315602 A1* | 12/2010 | Takahashi ................ G03B 3/00 353/70 |
| 2011/0128602 A1 | 6/2011 | Hamano et al. |
| 2014/0177022 A1 | 6/2014 | Saisho et al. |
| 2015/0253469 A1 | 9/2015 | Le Gros et al. |
| 2015/0370069 A1 | 12/2015 | Saisho et al. |
| 2016/0054562 A1 | 2/2016 | Kawai et al. |

(Continued)

FOREIGN PATENT DOCUMENTS

| EP | 3035110 A1 | 6/2016 |
|---|---|---|
| JP | 2012-208440 A | 10/2012 |

*Primary Examiner* — Michelle M Iacoletti
*Assistant Examiner* — Magda Cruz
(74) *Attorney, Agent, or Firm* — Posz Law Group, PLC

(57) ABSTRACT

An image projection device includes an emitting unit, a shaping unit, an adjusting unit, a scanning unit, and a projection optical system. The projection optical system is disposed such that a position of a front side principal plane of the projection optical system is at a position which is separated from the scanning unit by a focal length of the projection optical system.

20 Claims, 7 Drawing Sheets

(56) References Cited

U.S. PATENT DOCUMENTS

| | | |
|---|---|---|
| 2016/0178902 A1 | 6/2016 | Ando et al. |
| 2016/0202478 A1* | 7/2016 | Masson .............. G02B 26/0833 353/30 |
| 2016/0313562 A1* | 10/2016 | Saisho ............... G02B 27/0179 |
| 2016/0320616 A1* | 11/2016 | Ichii ................... G02B 27/0179 |
| 2017/0146809 A1 | 5/2017 | Furuya |
| 2017/0199382 A1 | 7/2017 | Nambara |
| 2017/0315353 A1 | 11/2017 | Saisho et al. |

* cited by examiner

IMAGE PROJECTION DEVICE AND HEAD-UP DISPLAY DEVICE PROVIDED WITH IMAGE PROJECTION DEVICE

CROSS-REFERENCE TO RELATED APPLICATIONS

The present application is a continuation application of International Patent Application No. PCT/JP2017/023775 filed on Jun. 28, 2017, which designated the U.S. and claims the benefit of priority from Japanese Patent Application No. 2016-127756 filed with the Japan Patent Office on Jun. 28, 2016. The entire disclosures of all of the above applications are incorporated herein by reference.

TECHNICAL FIELD

The present disclosure relates to an image projection device and a head-up display device provided with an image projection device.

BACKGROUND

An image projection device, such as one provided in a head-up display device, may use various optical elements to project a light beam onto a screen to form an image.

SUMMARY

According to one aspect of the present disclosure, an image projection device that projects light representing information onto a projection target surface may include an emitting unit, a shaping unit, an adjusting unit, a scanning unit, and a projection optical system. The emitting unit is configured to emit a light beam. The shaping unit is configured to shape a shape of the light beam emitted from the emitting unit. The adjusting unit is configured to adjust convergence and divergence of the light beam shaped by the shaping unit such that an imaging point of the light beam is positioned on the projection target surface. The scanning unit is configured to deflection scan the light beam whose convergence and divergence are adjusted by the adjusting unit. The projection optical system includes at least one optical element. The projection optical system is disposed on a path of the light beam from the scanning unit to the projection target surface and is configured to project the light beam, which is deflection scanned by the scanning unit, onto the projection target surface. The projection optical system is disposed such that a position of a front side principal plane of the projection optical system is at a position which is separated from the scanning unit by a focal length of the projection optical system.

DETAILED DESCRIPTION

Hereinafter, exemplary embodiments for implementing the present disclosure will be described with reference to the drawings.

First Embodiment

<Structure>

Figure 1:
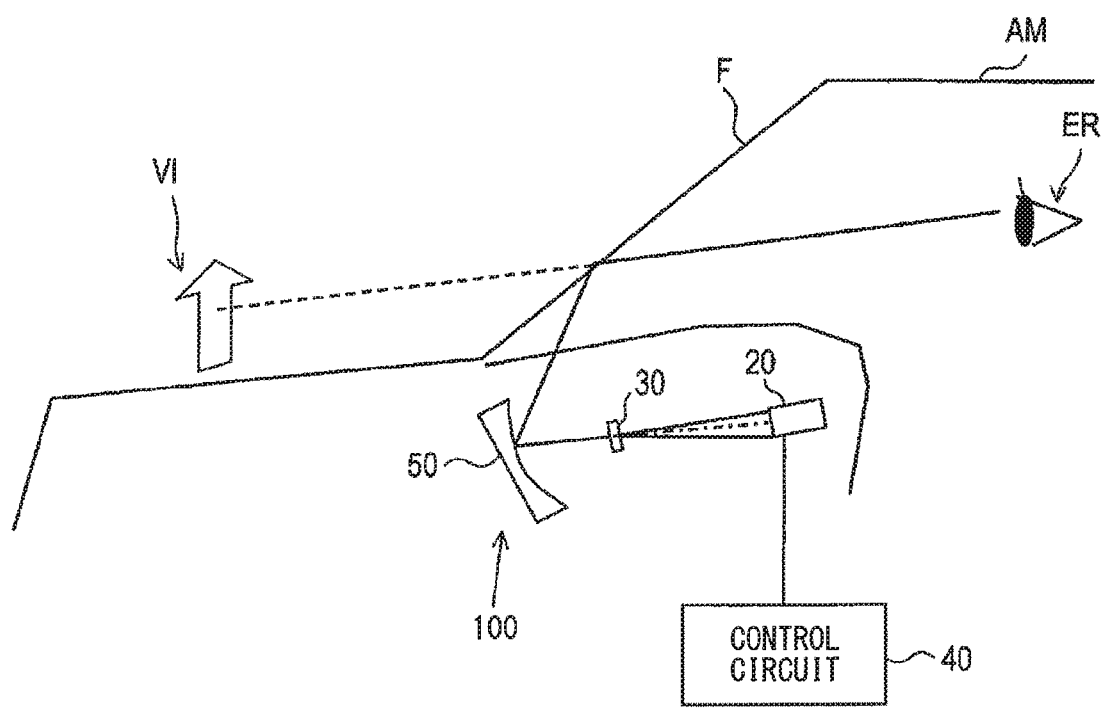
FIG. 1 is a figure in which an image projection device is applied to a head-up display.

First, the configuration of a head-up display (HUD) 100 to which an image projection device 20 according to a first embodiment is applied will be described with reference to FIG. 1. The HUD 100 includes the image projection device 20, a screen 30, an optical unit 50, and a control circuit 40, and is mounted in a vehicle AM.

The image projection device 20 is a device that projects light representing information, and is controlled by the control circuit 40. The screen 30 forms an image with the light projected from the image projection device 20. Details of the image projection device 20 and the screen 30 will be described later. The optical unit 50 includes an optical device that reflects light, and magnifies an incident image. As the optical unit 50, a concave mirror can be used, for example.

The light reflected by the optical unit 50 is reflected at the windshield F, which is a projection target member, and travels toward the line of sight of a driver, that is, an eye range ER. Then, the light reflected by the optical unit 50 forms a virtual image VI in front of the vehicle AM with respect to the eye range ER, so that the driver visually recognizes the virtual image VI formed in front of the vehicle AM. The various types of information displayed as the virtual image VI includes vehicle information and foreground information. Further, it should be noted that the projection target member is not limited to the front glass F, but may be a combiner instead.

Next, the configuration of the image projection device 20 will be described with reference to FIG. 2. The image projection device 20 includes an optical scanning device 10 and a projection optical system 21, and projects light representing information onto the screen 30. Here, the screen 30 is a projection surface.

The optical scanning device 10 includes a light emitting unit 15, a plane mirror 13, and a MEMS mirror 14.

The light emitting unit 15 includes a laser diode 11 (hereinafter, LD 11) and a collimator 12. The LD 11 irradiates a light beam. The collimator 12 corrects for aberrations in the shape of the light beam, which is emitted from the LD 11 and passed through the collimator 12, such that the light beam is shaped into parallel light. Although FIG. 2 shows a simplified view, FIG. 3 shows that the LD 11 includes a blue LD 11*b* that emits a blue beam, a green LD 11*g* that emits a green beam, and a red LD 11*r* that emits a red beam. Further, the collimator 12 includes a collimator 12*b* for shaping the blue beam into parallel light, a collimator 12*g* for shaping the green beam into parallel light, and a collimator 12*r* for shaping the red beam into parallel light. The various colors LD 11*b*, 11*g*, and 11*r* are electrically connected to the control circuit 40, and emission of light beams of respective colors from each color LD 11*b*, 11*g*, and 11*r* is controlled according to signals from the control circuit 40. It is to be noted that the parallel light here is not limited to strictly parallel light, but also includes light which is divergent or convergent to a degree which is not problematic if they are treated as parallel light.

Further, the light emitting unit 15 includes dichroic mirrors 110, 120, and 130. The dichroic mirror 110 is positioned in the traveling direction of the blue beam and reflects the blue beam toward the dichroic mirror 120. The dichroic mirror 120 transmits the blue beam while reflecting the green beam to combine the blue beam and the green beam. The dichroic mirror 130 transmits the combined blue and green beams and reflects the red beam to combine the light beams of the three primary colors. The combined light beam then strikes onto the plane mirror 13. In the present embodiment, the LD 11 corresponds to an emitting unit, and the collimator 12 corresponds to a shaping unit.

The plane mirror 13 is a flat mirror or the like on which a reflective film such as a metal film is deposited, and reflects the incident light beam toward the MEMS mirror 14.

The MEMS mirror 14 includes a convex mirror, which is a reflection optical element, and a drive unit which drives the convex mirror. The convex mirror of the MEMS mirror 14 changes a curvature R of the mirror surface, i.e., a focal length f0 of the convex mirror according to a signal from the control circuit 40. Consequently, the convex mirror of the MEMS mirror 14 adjusts the convergence and divergence of the light beam incident on the convex mirror, and controls the position of an imaging point of the light beam. In other words, the MEMS mirror 14 is a variable focal length element that changes the focal length f0. The convex mirror may be, for example, formed in an anamorphic shape using a piezoelectric film or the like, such as the variable focal point mirror described in JR 2016-45321A, the disclosure of which is incorporated herein by reference. Typically, aberrations such as astigmatism occur when light is obliquely incident on a reflecting surface having a curvature. In the present embodiment, however, the shape of the convex mirror of the MEMS mirror 14 is not a simple spherical surface, but instead has an anamorphic shape, thereby reducing the occurrence of the above mentioned aberrations. In the convex mirror of the MEMS mirror 14, the curvature R changes due to application of voltage.

Further, in accordance with a signal from the control circuit 40, the drive unit of the MEMS mirror 14 causes the convex mirror to oscillate around two mutually orthogonal rotation axes provided on the convex mirror. As a result, the drive unit of the MEMS mirror 14 two-dimensionally scans the light beam, whose convergence and divergence is adjusted, within a predetermined operation angle range. That is, the MEMS mirror 14 is a deflection element that deflection scans the light beam. In the present embodiment, the variable focal length element and the deflection element are constituted by the MEMS mirror 14 which is the same element. The MEMS mirror 14 corresponds to an adjusting unit and a scanning unit.

The projection optical system 21 includes at least one optical element and is arranged on the path of the light beam from the MEMS mirror 14 to the screen 30. The projection optical system 21 converts the light irradiated from the MEMS mirror 14 into convergent light and projects it onto the screen 30. In the present embodiment, as shown in FIG. 4, the projection optical system 21 includes, as optical elements, a lens 211 disposed toward the MEMS mirror 14 and a lens 212 disposed toward the screen 30.

Figure 2:
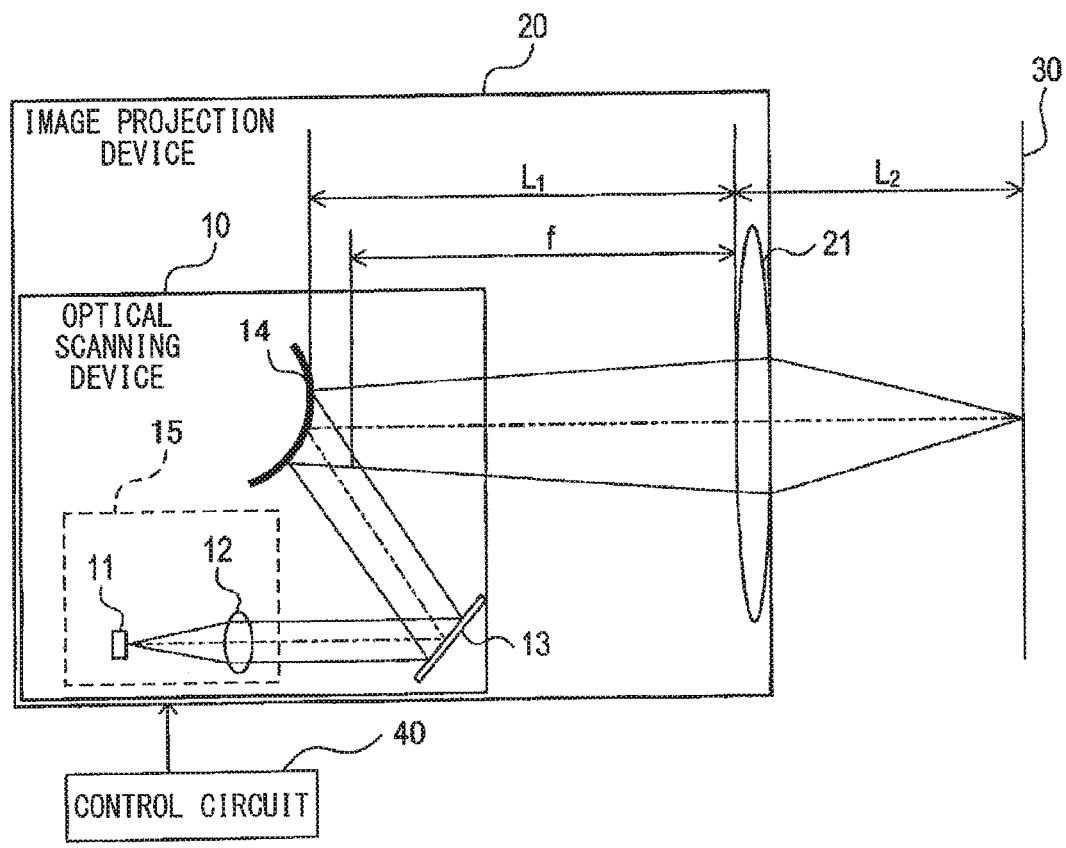
FIG. 2 is a figure showing a configuration of an image projection device.
Figure 3:
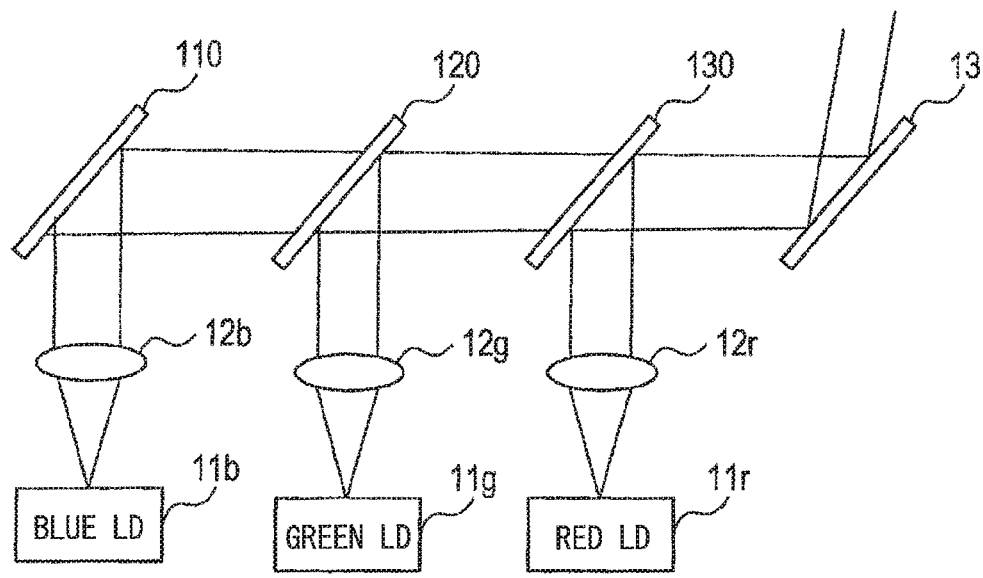
FIG. 3 is a figure showing a configuration for combining light beams of different colors.
Figure 4:
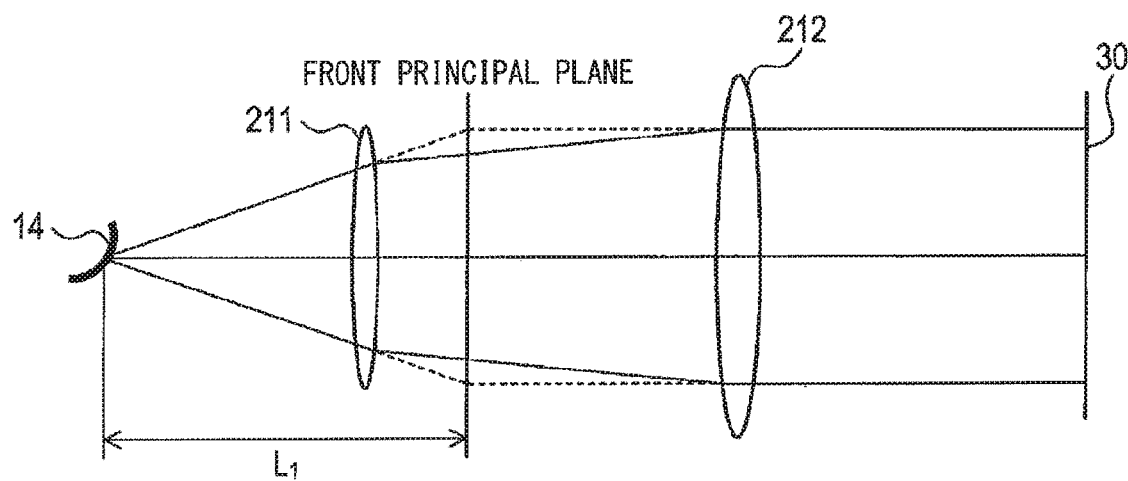
FIG. 4 is a figure showing a front-side principal plane of a projection optical system.

As shown in FIGS. 2 and 4, the projection optical system 21 is disposed such that an incident distance L1 from the MEMS mirror 14 to the front principal plane of the projection optical system 21 coincides with the focal length f of the projection optical system 21. That is, the projection optical system 21 is disposed at a position where the MEMS mirror 14 and the projection optical system 21 implement an object-side telecentric optical system.

Here, the principal plane is different from the paraxial quantity in an ordinary coaxial system. Here, the principal plane is a surface calculated based on the curvature and optical distance of the optical elements on the optical path of the light that scans the center of the scanning surface, the angle between the light beam and the surface normal, and so on. Specifically, it is calculated by the method described in the reference ARAKI, Keisuke: *Paraxial Analysis for Off-Axial Optical System*, Japanese Journal of Optics, 29 (2000) 156-163, the disclosure of which is incorporated herein by reference.

Further, in the present embodiment, as long as it can be considered that a telecentric optical system can be implemented, some misalignment between the incident distance L1 and the focal length f is permitted. As such, the present embodiment is not limited to perfect alignment. The allowable range of coincidence may be, for example, $0.9 < f/L1 < 1.1$. Further, if the projection optical system 21 includes only the lens 211, the front principal plane and the rear principal plane of the projection optical system 21 are the front principal plane and the rear principal plane of the lens 211.

Further, the projection optical system 21 has either an $f\theta$ characteristic or an $A \sin \theta$ characteristic. When the light beam is scanned at an equal angle by the MEMS mirror 14, the light beam can be scanned at a constant speed on the screen 30 by using the projection optical system 21 with the $f\theta$ characteristic. As a result, an image having a uniform spot diameter on the screen 30 can be obtained.

In addition, when the scanning speed of the light beam by the MEMS mirror 14 is slower the closer toward the edges of the image, the pixels are denser the closer toward the edges of the image. Accordingly, in this case, by using the projection optical system 21 having the $A \sin \theta$ characteristic in which the scanning speed becomes faster the closer toward the edge of the image, an image having a uniform pixel density over the entire display area can be obtained. Either a projection optical system having the $f\theta$ characteristic or the projection optical system having the $A \sin \theta$ characteristic may be appropriately selected to be used as the projection optical system 21.

The screen 30 is a screen including a reflective micromirror array (hereinafter referred to as MMA) or a transmissive microlens array (hereinafter referred to as MLA). Either a screen including a MMA or a screen including a MLA may be selected as appropriate to be used as the screen 30. The image formed on the screen 30 is enlarged and displayed on the windshield F or the like. As a result, a virtual image is formed in front of the windshield F or the like, and the driver visually recognizes the virtual image. In the present embodiment, the screen 30 corresponds to a projection target surface.

Further, the screen 30 may be connected to an actuator which is driven according to a signal from the control circuit 40. Further, depending on the information to be displayed, the actuator may be driven to move the screen 30, thereby changing a projection distance L2 from the rear side principal plane of the projection optical system 21 to the screen 30. As a result, virtual images are formed at positions which differ according to the information, so that the driver can classify and recognize the information according to the imaging positions of the virtual images.

In the present embodiment, a telecentric optical system is implemented, and the convergence and divergence of the light beam are adjusted according to the projection distance L2, so that a spot diameter S is substantially constant regardless of the projection distance L2. As a result, good imaging performance is realized. The spot diameter will be described below.

<Spot Diameter>

Figure 5:
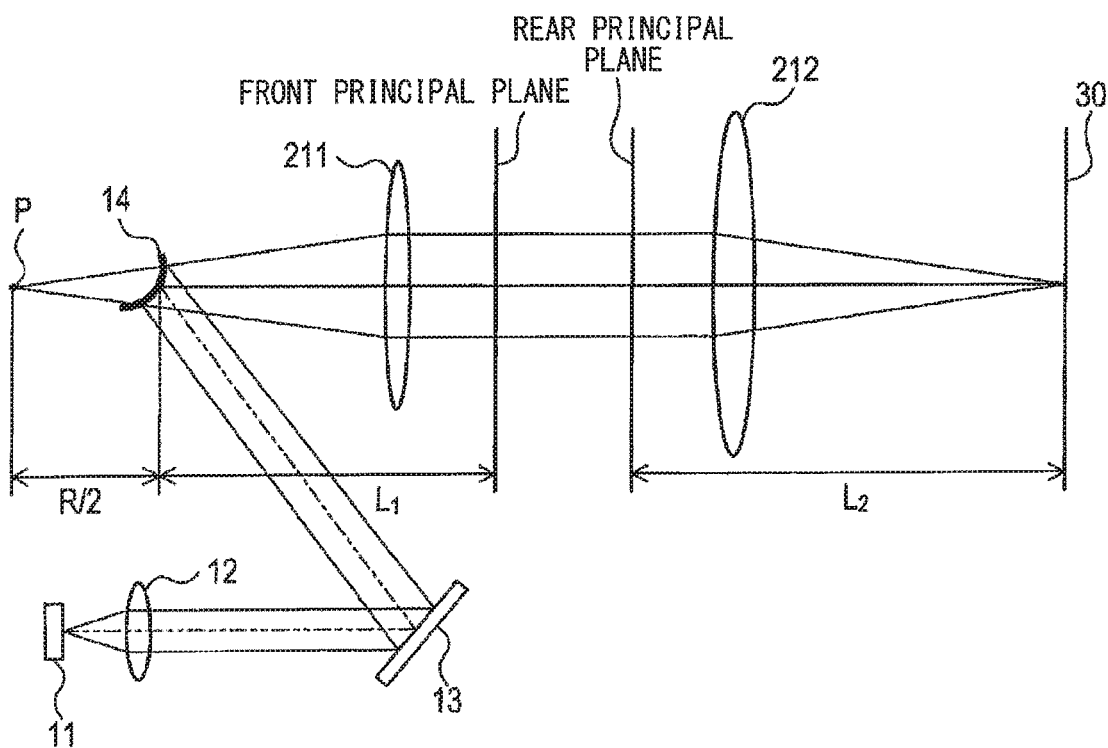
FIG. 5 is a figure showing the positional relationship between a MEMS mirror, a projection optical system, and a screen.

As shown in FIG. 5, when parallel light enters the convex mirror having a curvature R, the light is imaged at a position separated by R/2 from the position of the convex mirror, i.e., the MEMS mirror 14. In other words, a virtual image of the light emitting point of the LD is formed at a position P which is the position of the image forming point and separated by R/2 from the position of the MEMS mirror 14. Therefore, from the image formation formula of the projection optical system 21, the equation (1) is satisfied with the position P as the object plane. When equation (1) is transformed, it becomes equation (2).

[Equation 1]
$$\frac{1}{L_1 + \frac{R}{2}} + \frac{1}{L_2} = \frac{1}{f} \quad (1)$$

[Equation 2]
$$\frac{f}{L_1 + \frac{R}{2}} + \frac{f}{L_2} = 1 \quad (2)$$

If the projection distance L2 is changed while the curvature R of the convex mirror, the focal length f of the projection optical system, and the incident distance L1 are kept constant, the imaging formula is no longer satisfied. In other words, the imaging point of the light beam deviates from the screen 30. As a result, the spot diameter S on the screen 30 becomes large and the resolution of the image decreases. Therefore, in the present embodiment, the MEMS mirror 14 is a variable focal length variable, and the curvature R is changed according to the projection distance L2 so as to satisfy the imaging formula. However, even if the position of the image forming point of the light beam and the position of the screen 30 are not perfectly coincident with each other, the imaging point is allowed to deviate somewhat in position as long as the imaging point and the screen 30 are coincident with each other within a range in which it can be considered that the imaging point is on the screen 30. The allowable range of coincidence may be, for example, the range indicated in equation (3).

[Equation 3]
$$0.9 < \frac{f}{L_1 + \frac{R}{2}} + \frac{f}{L_2} < 1.1 \quad (3)$$

Figure 6:
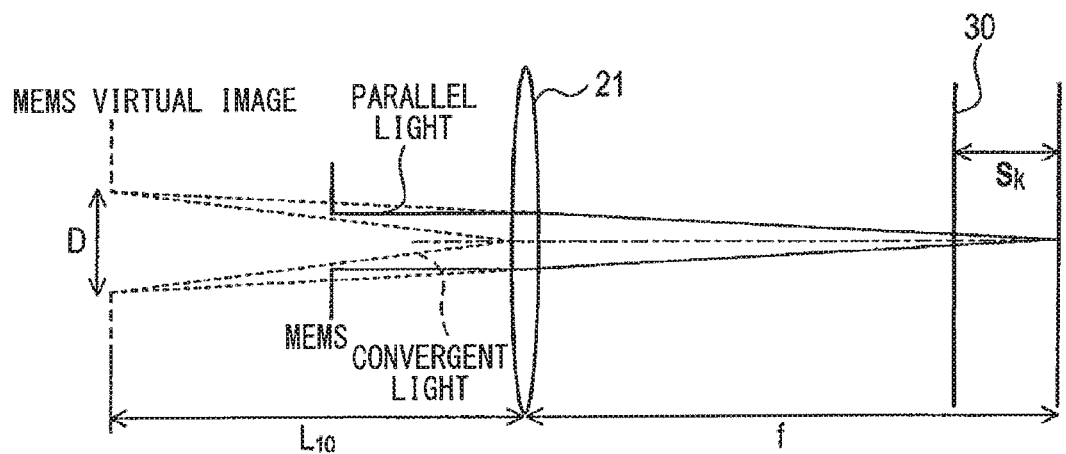
FIG. 6 is a figure showing telecentricity.

By changing the curvature R of the convex mirror, the position P changes. Therefore, in the case where the MEMS mirror 14 and the projection optical system 21 do not implement a telecentric optical system, the spot diameter S changes with the change in the curvature R even if the image is formed on the screen 30. In this regard, in the present embodiment, the MEMS mirror 14 and the projection optical system 21 form a telecentric optical system. As shown in FIG. 6, assuming that L10 is the distance from the front principal plane of the projection optical system 21 to the virtual image of the MEMS mirror 14, and D is the diameter of the virtual image of the MEMS mirror 14, when a telecentric optical system is implemented, the distance L10 and diameter D can be regarded as infinity. Therefore, even if the position P changes, there is no influence and the spot diameter S does not change.

More specifically, as shown in FIG. 6, when parallel light is incident on the projection optical system 21 an image is formed at a position separated from the rear principal plane of the projection optical system 21 by the focal distance f. The position of this imaging point is taken as the reference position. Here, by changing the curvature R and converging or diverging the parallel light, the light beam is focused on a position away from the reference position of the projection optical system 21 by a deviation Sk. In this case, the spot diameter S is $S \propto (L10+f+Sk)/D$. When a telecentric optical system is realized, since the distance L10 and the diameter can be regarded as infinity, the influence of the deviation Sk can be ignored. Therefore, the spot diameter S can always be regarded as constant.

<Effects>

According to the first embodiment described above, the following effects can be exhibited.

(1) Since the convergence and divergence of the light beam are adjusted even if the projection distance L2 is changed, the image forming point of the light beam can be aligned with the screen 30. Further, by realizing a telecentric optical system by the MEMS mirror 14 and the projection optical system 21, even if the position of the imaging point of the MEMS mirror 14 changes, it is possible to suppress changes in the spot diameter S on the screen 30. Therefore, regardless of the projection distance L2, good image formation on the screen 30 can be obtained. As a result, good imaging performance can be obtained even if using a projection optical system 21 common to a plurality of vehicle types.

(2) In a configuration where the variable focal length element adjusts the convergence and divergence of the light beam using the reflecting optical element, the variable focal length element and the deflecting element can be implemented by one MEMS mirror 14.

(3) By changing the curvature R of the convex mirror of the MEMS mirror 14 according to the projection distance L2, the position of the imaging point of the convex mirror can be changed to a position corresponding to the projection distance L2. Therefore, regardless of the projection distance L2, the image forming point of the light beam can be aligned on the screen 30.

(4) When the light beam is scanned at an equal angle by the MEMS mirror 14, an image having a uniform spot diameter from its center to its edges can be obtained by using the projection optical system 21 with the fθ characteristic.

(5) When the scanning speed of the light beam by the MEMS mirror 14 becomes slower the closer toward the edges of the image, it is possible to obtain an image having a uniform image density over the entire display area by using the projection optical system 21 with the A sin θ characteristic.

Second Embodiment

<Differences from First Embodiment>

Since the basic configuration of an image projection device 20A according to the second embodiment is the same as that of the image projection device 20 according to the first embodiment, descriptions of shared configurations will be omitted, and the discussion will be primarily focused on differences. Note that the same reference numerals as those in the first embodiment indicate the same configuration, and refer to the preceding descriptions.

Figure 7:
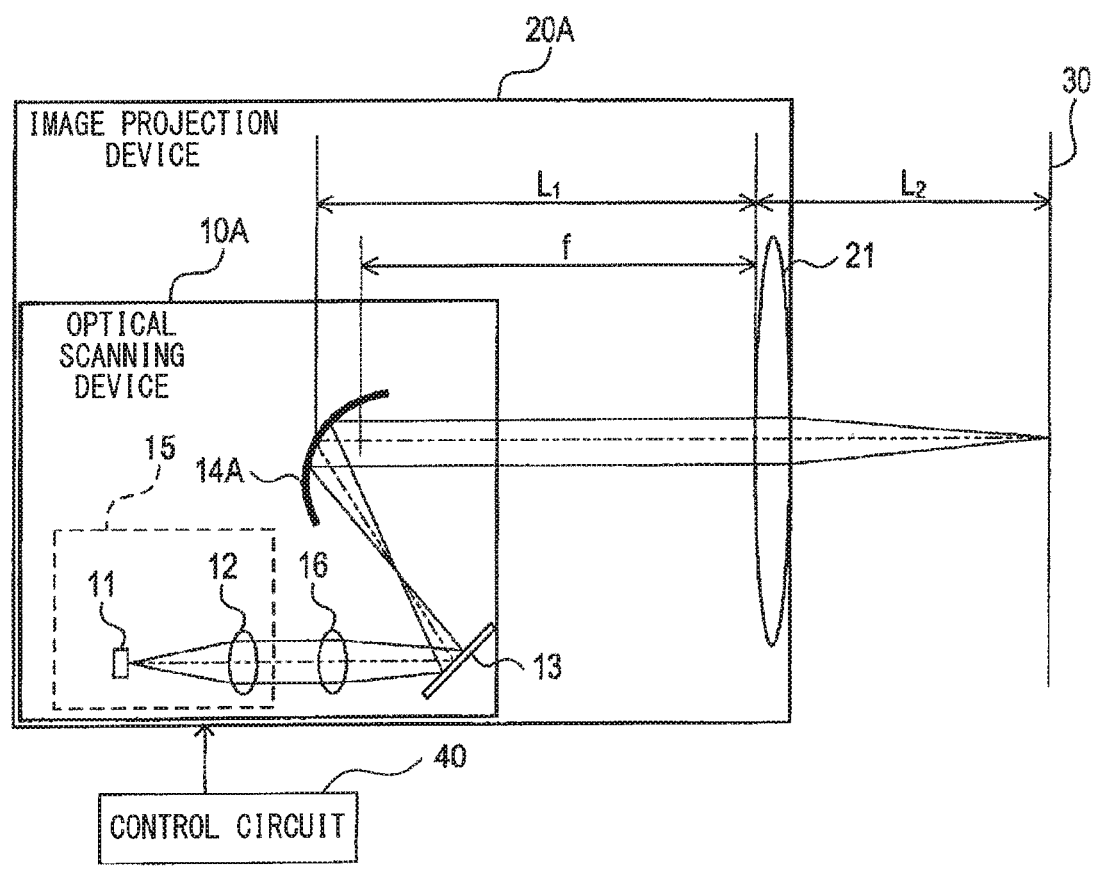
FIG. 7 is a figure showing a configuration of an image projection device.

In the optical scanning device 10 according to the first embodiment, a convex mirror is used in the MEMS mirror 14. On the other hand, in the optical scanning device 10A according to the second embodiment, as shown in FIG. 7, a concave mirror is used for the MEMS mirror 14A instead. In the present embodiment, the MEMS mirror 14A adjusts the convergence and divergence of the light beam such that the imaging point is located on the screen 30 by changing a curvature Ra of the concave mirror according to the projection distance L2.

Further, in the present embodiment, a condenser lens 16 is provided between the collimator 12 and the MEMS mirror 14A. If parallel light is reflected by the concave mirror, it becomes convergent light as indicated by the dashed line in FIG. 6. On the other hand, when divergent light is reflected by the concave mirror, it becomes parallel light. Accordingly, when the light beam reflected by the concave mirror is parallel light, the position of the imaging point of the light beam can be adjusted only in the direction in which the light beam is converged. That is, the position of the screen 30 can be adjusted only in the direction of approaching the projection optical system 21 from the above mentioned reference position. Conversely, when the light beam reflected by the concave mirror is divergent light, the position of the imaging point of the light beam can be adjusted both in the direction in which the light beam is converged and in the direction in which the light beam diverges. In other words, the position of the screen 30 can be adjusted both in the direction of moving away from the projection optical system 21 and in the direction of approaching the projection optical system 21 with respect to the reference position.

Here, in the present embodiment, the condenser lens 16 is provided between the collimator 12 and the MEMS mirror 14A. As a result, before the light beam enters the MEMS mirror 14, the light beam momentarily forms an image and becomes convergent light. After that, the light beam enters the MEMS mirror 14A. That is, divergent light is incident on the MEMS mirror 14A. Then, the MEMS mirror 14A scans the parallel light formed by the divergent light being reflected by the concave surface.

In the present embodiment, the light beams of three colors are temporarily imaged by the one condenser lens 16. Therefore, an achromatic lens is used for the condenser lens 16. As a result, the positions of the momentary imaging point of the light beams of three colors can be aligned, and it is possible to reduce deviations in the position of the imaging point of the light beams of three colors on the screen 30. The position of the condenser lens 16 may be between the collimator 12 and the plane mirror 13, or may be between the plane mirror 13 and the MEMS mirror 14A.

Further, instead of the condenser lens 16, a divergent light may be produced using a lens having a negative power (for example, a concave lens). Further, a reflecting surface may be used in place of the lens.

In the present embodiment, assuming that the distance from the imaginary imaging point of the condenser lens 16 to the MEMS mirror 14A is a constant value La, the light beam incident on the MEMS mirror 14A is imaged at a position which is $Sa=RaLa/(2La-Ra)$ from the MEMS mirror 14A. Therefore, the curvature Ra of the concave mirror of the MEMS mirror 14A is set so as to satisfy the equation (3) in which Sa is substituted for R/2. In the present embodiment, the condenser lens 16 corresponds to a diverging unit.

<Effects>

According to the second embodiment described above, the effects (1), (2), (4) and (5) of the first embodiment can be obtained. Further, by changing the curvature Ra of the concave mirror of the MEMS mirror 14A instead of the curvature R of the convex mirror of the MEMS mirror 14, the same effect as in the effect (3) can be obtained. Furthermore, the following effect (6) is obtained.

(6) Since the condenser lens 16 is provided, even when a MEMS mirror 14A having a concave mirror is used, the position of the screen 30 can be adjusted, from the reference position, in both the direction of approaching the projection optical system 21 and the direction of moving away from the projection optical system 21.

Third Embodiment

<Differences from First Embodiment>

Since the basic configuration of an image projection device 20B according to the third embodiment is the same as that of the image projection device 20 according to the first embodiment, descriptions of shared configurations will be omitted, and the discussion will be primarily focused on differences. Note that the same reference numerals as those in the first embodiment indicate the same configuration, and refer to the preceding descriptions.

Figure 8:
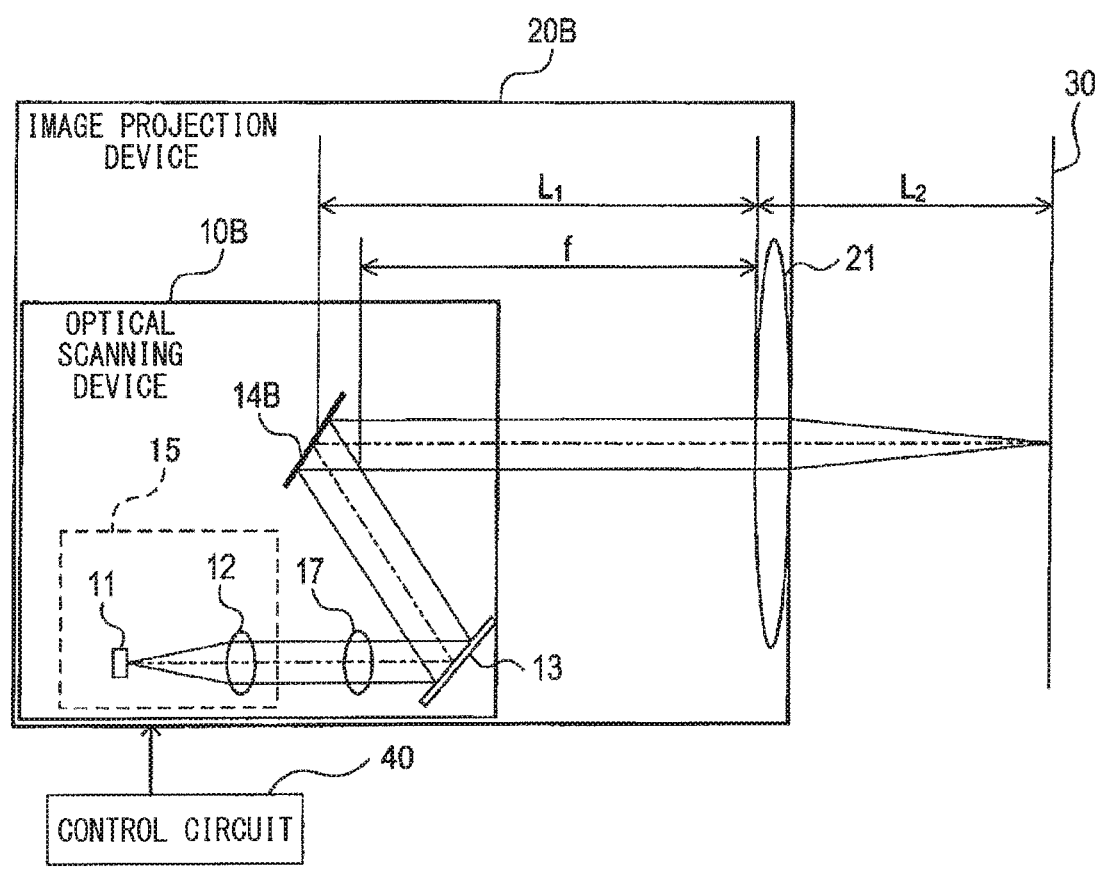
FIG. 8 is a figure showing a configuration of an image projection device.

In the optical scanning device 10 according to the first embodiment, the variable focal length element and the deflection element are implemented by the MEMS mirror 14. On the other hand, in an optical scanning device 10B according to the third embodiment, as shown in FIG. 8, the deflection element is provided by a MEMS mirror 14B, and separately, a variable focal length lens 17 is additionally provided as a variable focal length element.

The MEMS mirror 14B includes a planar mirror, which is a planar reflection optical element, and a drive unit which drives the planar mirror. The variable focal length lens 17 is a transmission type lens, and adjusts the convergence and divergence of the light beam passing therethrough by changing a curvature Rb of the transmission type lens according to a signal from the control circuit 40.

<Effects>

According to the third embodiment described above, the effects (1), (4) and (5) of the first embodiment can be obtained. Further, by changing the curvature Rb of the variable focal length lens 17 instead of the curvature R of the convex mirror included in the MEMS mirror 14, the same effect as the effect (3) can be obtained

Fourth Embodiment

<Differences from Second Embodiment>

Since the basic configuration of an image projection device 20O according to the fourth embodiment is the same as that of the image projection device 20A according to the second embodiment, descriptions of shared configurations will be omitted, and the discussion will be primarily focused on differences. Note that the same reference numerals as those in the second embodiment indicate the same configuration, and refer to the preceding descriptions.

Figure 9:
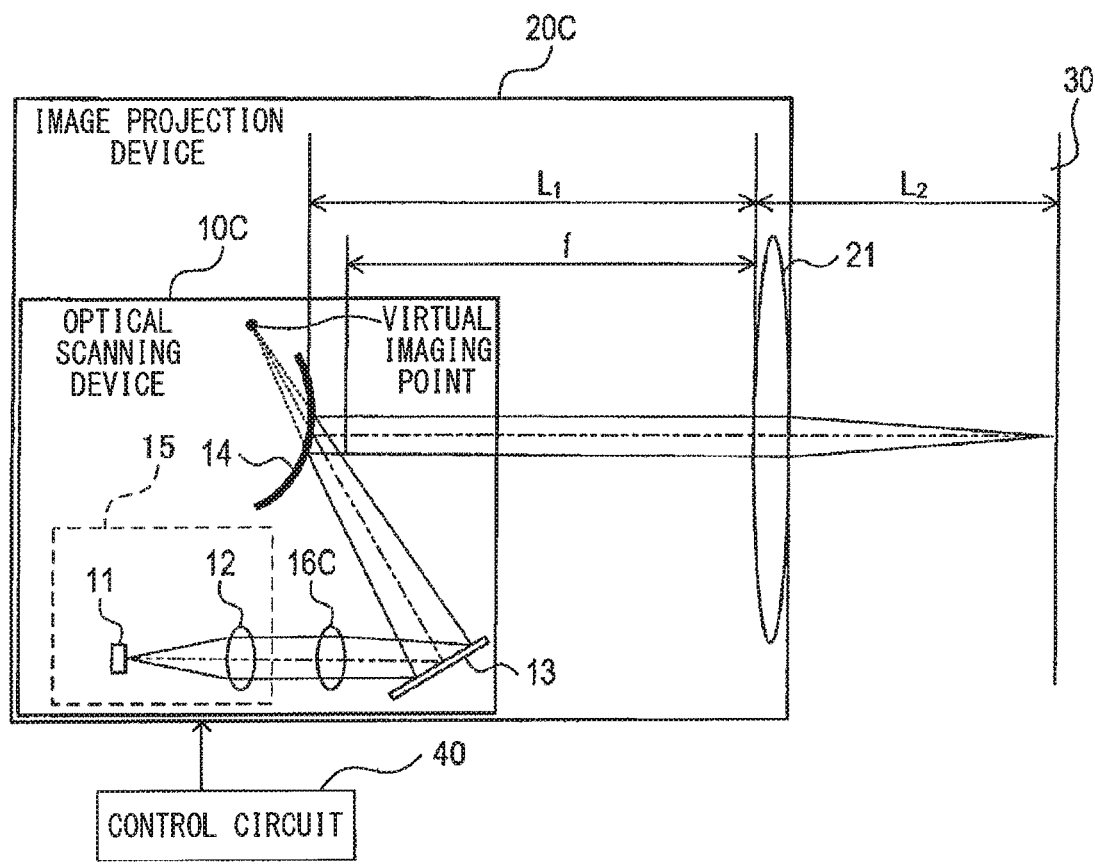
FIG. 9 is a figure showing a configuration of an image projection device.

In the optical scanning device 10A according to the second embodiment, the concave mirror MEMS mirror 14A is used. In contrast, as shown in FIG. 9, the image projection device 20C according to the fourth embodiment is different in that a MEMS mirror 14 with a convex mirror is used, similar to the optical scanning device 10 according to the first embodiment.

Further, in the present embodiment, a condenser lens 160 causes convergent light to enter the MEMS mirror 14 without momentarily imaging the light beam prior to entering the MEMS mirror 14. Then, the MEMS mirror 14 scans the parallel light formed by the convergent light being reflected on the convex surface. A reflecting surface may be used instead of the condenser lens 16C as well. In the present embodiment, the condenser lens 16C corresponds to a converging unit.

<Effects>

According to the fourth embodiment described above, the effects (1) to (5) of the first embodiment are obtained.

Comparative Example

An image projection device of a comparative example will be described in order to more easily appreciate the effects and advantages exhibited by one or more embodiments of the present disclosure.

In the image projection device of the comparative example, a laser beam is shaped by a divergence angle conversion element, the shaped laser beam is scanned by a MEMS mirror and enters a deflection angle conversion element, and is formed on a screen via the deflection angle conversion element.

In the image projection device of the comparative example, if the image forming point of the laser beam deviates from the screen, there is a possibility that spot diameter increases and the resolution of the image decreases. Therefore, when installing the image projection device of the comparative example in a vehicle, it is desirable to change a projection distance from the deflection angle conversion element, which is an element of the projection optical system, to the screen in accordance with the arrangement space that varies depending on the type of the vehicle. However, as a result of detailed consideration by the present inventors, it was found that if the projection optical system is specifically designed for each vehicle type in order to obtain good image forming performance regardless of the projection distance mentioned above, there is an issue in that cost and labor, etc. may be increased.

In contrast, according to at least one embodiment among the various embodiments of the present disclosure, it is possible to provide an image projection device and a head-up display including an image projection device that can obtain good imaging performance using a common projection optical system regardless of the projection distance.

For example, according to at least one embodiment among the various embodiments of the present disclosure, even when the projection distance from the projection optical system to the projection target surface is changed, by adjusting the convergence and divergence of the light beam, it is possible to align an imaging point of the light beam onto the projection target surface. In addition, since the position of the front side principal plane of the projection optical system is arranged at a position separated from the scanning unit by the focal length of the projection optical system, an object-side telecentric optical system is provided. Accordingly, by adjusting the convergence and divergence of the light beam, even when the position of the imaging point of the light beam changes, it is possible to suppress changes in the spot diameter on the projection target surface. Consequently, good imaging can be obtained using a common projection optical system regardless of the projection distance Other Embodiments Although embodiments of the present disclosure have been described above, the present disclosure is not limited to the above-described embodiments, and various modifications can be made.

(a) In each of the above embodiments, the plane mirror 13 is provided between the collimator 12 and the MEMS mirror 14, 14A, 14B, but the plane mirror 13 may not be provided. Alternatively, a plurality of plane mirrors 13 may be provided. The plane mirrors 13 may be appropriately provided according to the desired size of the optical scanning device 10.

(b) A plurality of functions of one element in the above embodiment may be implemented by a plurality of elements, or one function of one element may be implemented by a plurality of elements. Further, a plurality of functions of a plurality of elements may be implemented by one element, or one function implemented by a plurality of elements may be implemented by one element. A part of the configuration of the above embodiments may be omitted. At least a part of the configuration of the above embodiments may be added to or replaced with the configuration of another one of the above embodiments.

(c) In addition to the above described image projection device, the present disclosure can be implemented in various forms such as a head-up display device or a system which includes the image projection device as a component.

The invention claimed is:

1. An image projection device that projects light representing information onto a projection target surface, comprising:
   an emitting unit configured to emit a light beam;
   a shaping unit configured to shape a shape of the light beam emitted from the emitting unit;
   an adjusting unit configured to adjust convergence and divergence of the light beam shaped by the shaping unit such that an imaging point of the light beam is positioned on the projection target surface, wherein the adjusting unit is a reflection optical element configured to reflect the light beam whose convergence and divergence are adjusted;
   a scanning unit configured to deflection scan the light beam whose convergence and divergence are adjusted by the adjusting unit; and
   a projection optical system including at least one optical element, the projection optical system being disposed on a path of the light beam from the scanning unit to the projection target surface and being configured to project the light beam, which is deflection scanned by the scanning unit, onto the projection target surface, the projection optical system being disposed such that a position of a front side principal plane of the projection optical system is at a position which is separated from the scanning unit by a focal length of the projection optical system,
   wherein the adjusting unit is configured to change a curvature of a reflecting surface of the adjusting unit according to a projection distance from a rear side principal plane of the projection optical system to the projection target surface to adjust the convergence and the divergence of the light beam.

2. The image projection device according to claim 1, wherein
the adjusting unit and the scanning unit are provided by a common element.

3. The image projection device according to claim 2, wherein
the reflecting surface is formed on a convex surface and reflects the light beam.

4. The image projection device according to claim 3, further comprising:
a converging unit between the shaping unit and the adjusting unit configured to cause the light beam shaped by the adjusting unit to converge and to cause the convergent light to enter the adjusting unit.

5. The image projection device according to claim 2, wherein
the reflecting surface which is formed on a concave surface and which reflects the light beam.

6. The image projection device according to claim 5, further comprising:
a diverging unit between the shaping unit and the adjusting unit configured to cause the light beam shaped by the shaping unit to diverge and to cause the divergent light to enter the adjusting unit.

7. The image projection device according to claim 1, wherein
the projection optical system has an fθ characteristic.

8. The image projection device according to claim 1, wherein
the projection optical system has an A sin θ characteristic.

9. The image projection device according to claim 1, wherein
the projection target surface includes a screen having a micromirror array.

10. The image projection device according to claim 1, wherein
the projection target surface includes a screen having a microlens array.

11. A head-up display device comprising:
the image projection device according to claim 1.

12. An image projection device that projects light representing information onto a screen, comprising:
a light diode configured to emit a light beam;
a collimator configured to shape a shape of the light beam emitted from the light diode;
a MEMS mirror configured to
adjust convergence and divergence of the light beam shaped by the collimator such that an imaging point of the light beam is positioned on the screen, and after adjusting the convergence and divergence of the light beam, deflection scan the light beam; and
a projection optical system including at least one optical element, the projection optical system being disposed on a path of the light beam from the MEMS mirror to the screen and being configured to project the light beam, which is deflection scanned by the MEMS mirror, onto the screen, the projection optical system being disposed such that a position of a front side principal plane of the projection optical system is at a position which is separated from the MEMS mirror by a focal length of the projection optical system,
wherein the MEMS mirror is further configured to change a curvature of a reflecting surface of the MEMS mirror according to a projection distance from a rear side principal plane of the projection optical system to the screen to adjust the convergence and the divergence of the light beam.

13. The image projection device according to claim 12, wherein
the projection optical system has an fθ characteristic.

14. The image projection device according to claim 12, wherein
the projection optical system has an A sin θ characteristic.

15. The image projection device according to claim 12, wherein
the screen includes a micromirror array.

16. The image projection device according to claim 12, wherein
the screen includes a microlens array.

17. An image projection device that projects light representing information onto a screen, comprising:
a light diode configured to emit a light beam;
a collimator configured to shape a shape of the light beam emitted from the light diode;
a variable focal length lens configured to adjust convergence and divergence of the light beam shaped by the collimator;
a MEMS mirror configured to deflection scan the light beam whose convergence and divergence are adjusted by the variable focal length lens; and
a projection optical system including at least one optical element, the projection optical system being disposed on a path of the light beam from the MEMS mirror to the screen and being configured to project the light beam, which is deflection scanned by the MEMS mirror, onto the screen, the projection optical system being disposed such that a position of a front side principal plane of the projection optical system is at a position which is separated from the MEMS mirror by a focal length of the projection optical system,
wherein the MEMS mirror is further configured to change a curvature of a reflecting surface of the MEMS mirror according to a projection distance from a rear side principal plane of the projection optical system to the screen to adjust the convergence and the divergence of the light beam.

18. The image projection device according to claim 17, wherein
the projection optical system has an fθ characteristic.

19. The image projection device according to claim 17, wherein
the projection optical system has an A sin θ characteristic.

20. The image projection device according to claim 17, wherein
the screen includes a micromirror array or a microlens array.

* * * * *